June 14, 1932.   A. W. BELL   1,862,563
APPARATUS FOR TREATING CHEESE
Filed July 14, 1928   2 Sheets-Sheet 1
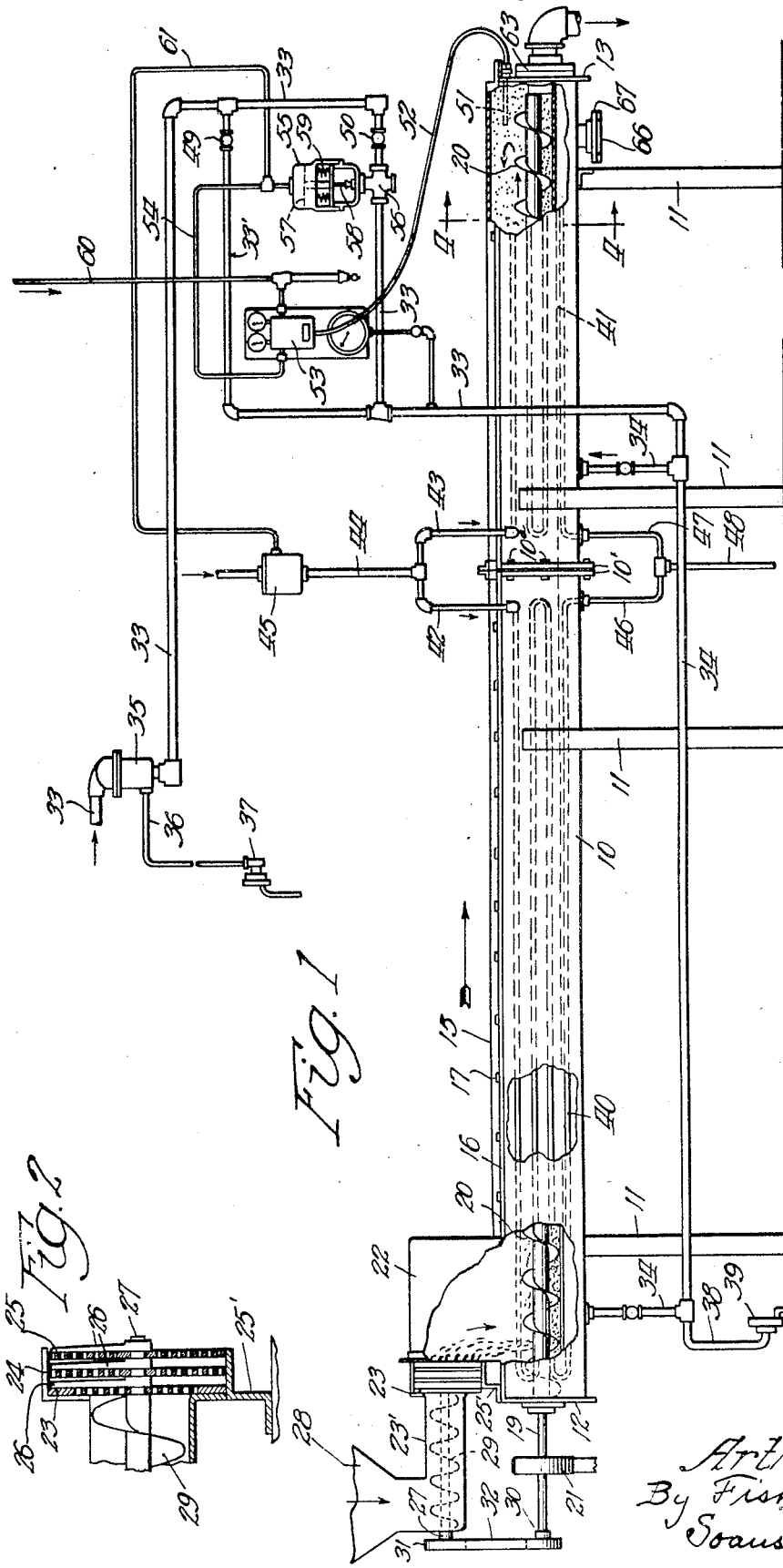
Inventor
Arthur W. Bell
By Fisher, Clapp,
Soans + Pond, Attys.

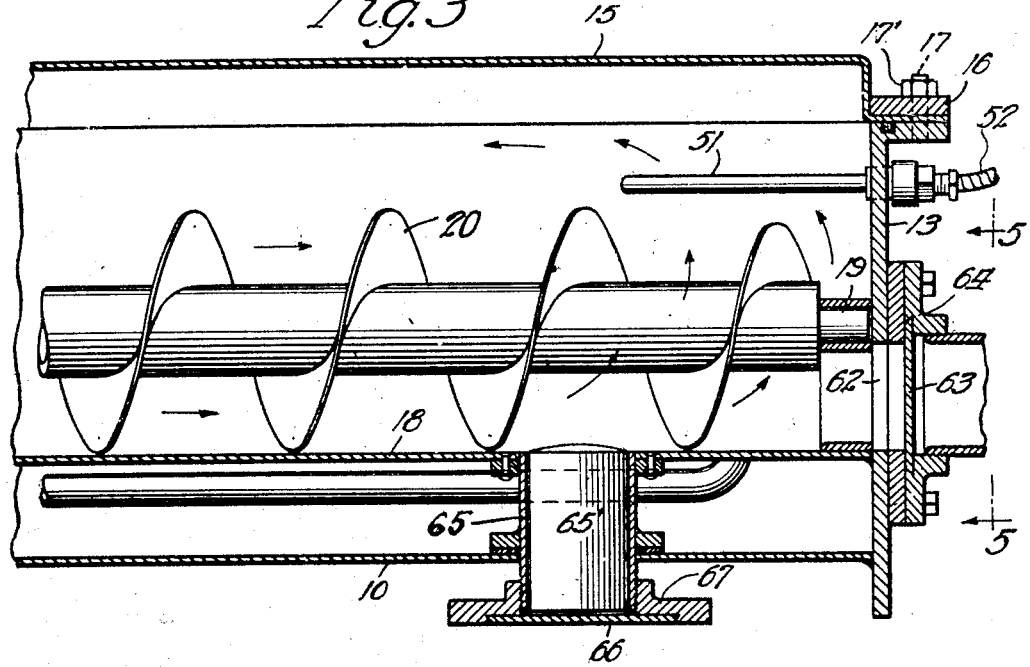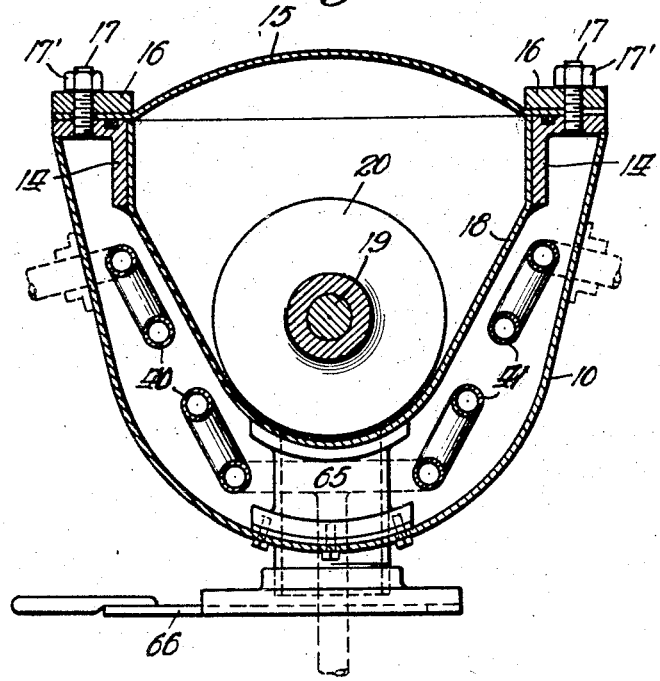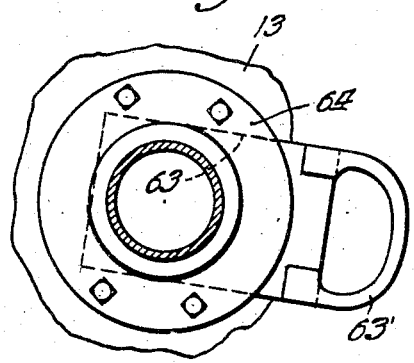

Patented June 14, 1932

1,862,563

UNITED STATES PATENT OFFICE

ARTHUR W. BELL, OF CHICAGO, ILLINOIS, ASSIGNOR, BY MESNE ASSIGNMENTS, TO KRAFT-PHENIX CHEESE CORPORATION, OF CHICAGO, ILLINOIS, A CORPORATION OF DELAWARE

APPARATUS FOR TREATING CHEESE

Application filed July 14, 1928. Serial No. 292,850.

This invention relates to apparatus for carrying out a process of treating cheese described and claimed in Letters Patent to James L. Kraft No. 1,323,869 dated December 2, 1919.

As pointed out in the specification of the aforesaid patent, it is very important that the cooking and sterilizing temperature be maintained strictly within narrow limits to avoid injuring the quality of the product, and the general object of the present invention is to provide an apparatus for thus treating the cheese which will insure the superior and uniform quality of the product. Other objects are to provide an improved cooking chamber and agitator, and to provide, in association therewith, means for automatically controlling the temperature existing in the cooking chamber during the cooking operation.

Still other objects and attendant advantages of the invention will be apparent to persons skilled in the art as the same becomes better understood by reference to the following detail description, taken in connection with the accompanying drawings in which I have illustrated a practical and approved embodiment of the principle of the invention, and wherein—

Fig. 1 is a side elevation, partly broken out and in section of the cooking chamber and the feed and discharge devices thereof, together with a diagrammatic illustration of the automatic temperature controls;

Fig. 2 is a detail sectional view of the device for comminuting the stock as it is fed to the cooking chamber;

Fig. 3 is an enlarged vertical section through the rear end of the cooking chamber, showing the thermostat bulb, the valve controlling the discharge of the cooked cheese, and the wash-out discharge valve of the cooking chamber;

Fig. 4 is a vertical section through the cooking chamber;

Fig. 5 is a side elevation of the slide valve controlling the discharge of the cooked stock.

Referring to the drawings, 10 designates as an entirety a horizontal trough conveniently supported on vertical legs 11. This trough 10 is provided with closure plates 12 and 13 welded or otherwise secured to the ends thereof. Mounted on and welded or otherwise secured to the upper edges of the trough 10 and the end plates 12 and 13 are a pair of angle bars 14 (Fig. 4), on the horizontal limbs of which rest the longitudinal edges of a removable cover 15 secured in place by clamp bars 16 and threaded studs 17, and nuts 17'. Within and spaced from the trough 10 is a second trough 18, the upper edge portions of which are welded or otherwise secured to the depending limbs of the angle bars 14.

The space bounded by the inner trough 18 and the cover 15 constitutes the sterilizing and cooking chamber, while the space between the two troughs constitutes the heating chamber.

Extending lengthwise of the inner trough 18 and journaled in bearings on the end walls 12 and 13 is a long shaft 19 fast on which is a spiral 20. The shaft 19 at one end extends through the wall 12 and is provided with a drive pulley 21.

The cover 15 terminates somewhat short of the receiving end of the cooking chamber, and mounted on the receiving end of the latter is a box 22 tightly fitted to the top edges of the cooking chamber and communicating freely on its lower side with the latter. On the outer vertical wall of the box 22 is mounted a cheese cutting or comminuting mechanism preferably consisting, as best shown in Fig. 2, of a plurality of spaced stationary discs 23, 24 and 25 mounted on a supporting bracket 25' on the cooking chamber and formed with holes of decreasing size from left to right, viewing Figs. 1 and 2, and a series of rotary knives 26 each in shearing relation to the discharge side of one of the apertured discs; the knives 26 being fast on and driven by a shaft 27. Connected to the outer side of the disc 23 is a feed tube 23' communicating at its outer end with a feed hopper 28 indicated in Fig. 1. The shaft 27 extends through the feed tube 23' and projects beyond the same and carries a feed screw or spiral 29 driven from the shaft 19 by pulleys 30 and 31 and a belt 32.

The cheese stock to be treated is cut up into small pieces and fed into the hopper 28, where it is caught by the screw 29 and, by the latter, forced through the comminuting mechanism shown in Fig. 2, the comminuted product falling through the box 22 into the receiving end of the cooking chamber, and being gradually advanced through the latter by the long spiral 20 toward the rear end of the chamber. As the feed continues, the finely divided cheese builds up in and gradually fills the cooking chamber from the discharge end toward the receiving end, and when the chamber is substantially full, the feed is arrested and the comminuted stock is subjected to the cooking and sterilizing operation next to be described.

Preferably and as herein shown the heating medium consists of steam, which is introduced to the cooking chamber through a steam supply pipe 33 and valve-controlled branch pipes 34 leading into the bottom of the cooking chamber. The steam supply pipe 33 is preferably equipped with a moisture separator indicated at 35 from which a water discharge pipe 36 leads into a trap 37 that discharges the water of condensation and seals the steam against escape. On its lower end the steam pipe 34 is also equipped with a water drain pipe 38 and trap 39.

The degree of heat supplied by the steam entering the heating chamber is automatically limited in this instance by cold water coils 40 and 41 extending lengthwise of both sides of the heating chamber, the inner upper ends of said coils being connected to branch pipes 42 and 43 leading from a main water supply pipe 44, in which latter is preferably inserted an automatic water supply regulating device conventionally shown at 45 and containing a valve that is normally closed, but is adapted to be opened by thermostat-controlled air pressure when the heat in the cooking chamber exceeds a predetermined limit. The lower inner ends of said coils connect with branch pipes 46 and 47 on a water outlet or discharge pipe 48. For convenience in assembling the cooling coils 40 and 41, the outer trough 10 is made in two abutting sections united by meeting flanges 10' and connecting bolts 10ª.

Into the main steam supply pipe 33 is connected a steam by-pass pipe 33' equipped with hand valves 49 and 50, the purpose of which will hereinafter appear.

Mounted in the outer end wall 13 of the cooking chamber (Fig. 3) is a thermostat bulb 51 connected by a flexible hose 52 with a compressed air-operated heat regulator designated as an entirety by 53, which latter, through a compressed air pipe line 54 and a valve-operating device 55, effects the closing movement and controls the opening movement of a steam throttle valve 56 in the steam supply line 33, the valve 56 being closed by air pressure on top of diaphragm 57 resting on the valve stem 58, and opened by springs 59 acting against reduced air pressure. A pipe 60 carrying compressed air at or about fifteen pounds is connected into one side of the heat regulator 53, which latter contains a thermostatically-controlled valve that prevents the passage of the compressed air through the heat regulator to the pipe line 54 until it is opened by the thermostat. From the pipe 54 a branch air pipe 61 leads into the water regulator 45, this latter containing a water control valve that is normally closed to shut off the water supply and is opened only by compressed air admitted through pipe 61.

In the discharge end of the cooking chamber is a delivery opening 62 (Fig. 3) normally closed by a slide valve 63 mounted in a slideway 64 attached to the outer side of the end wall 13 and equipped on one end with a handle 63' (Fig. 5) by which it may be manually opened and closed. In the bottoms of the outer and inner troughs 10 and 18 are formed registering openings which receive a short discharge pipe 65 (Fig. 3), the lower end of which is normally closed by a slide valve 66 mounted in a valve guide 67, the valve 66 and its guide 67 being structurally similar to the valve 63 and guide 64; the pipe 65 forming an outlet for hot water used to clean and sterilize the cooking chamber after each batch of cheese has been cooked and discharged, and preliminary to the reception of a fresh batch. The discharge pipe 65 is normally filled by a removable plug 65' to prevent waste of cheese by being packed in the discharge pipe.

In the operation of the apparatus, with valve 50 closed and valve 49 open, the steam is turned on before the cooking chamber is loaded as above described, and the same enters the heating jacket between the outer and inner troughs 10 and 18 and rapidly raises the temperature of the cooking chamber. As soon as the steam is turned on, the spiral 20 is set in motion to continuously agitate the material as it is charged into the chamber, and under the heat the latter assumes a more or less viscous and plastic state, flowing backwardly above the spiral toward the receiving end. The proper temperature for the cooking may be varied anywhere between 125° F. and 155° F. depending upon the kind or kinds of cheese undergoing treatment. Sometime before this critical temperature is reached, the valve 49 is closed and the valve 50 opened and the flow of steam is then past the open throttle valve 56. When the temperature in the cooking chamber reaches the upper limit for which the thermostat is set, the thermostat opens the air valve in the heat regulator 53, and the pressure of the compressed air in pipe 54 builds up until it closes the steam throttle valve 56. Thereafter, and due to the pressure of the compressed air in pipe 61, the valve in the water regulator 45 opens and permits a flow of cold water through the coils 40 and 41. By thus shutting off the flow of steam and opening the flow of water, the heat in the cooking chamber is rapidly lowered to a point within the critical temperature limits. Since the critical temperature for yielding the best quality of cheese may vary several degrees, the thermostatic control easily maintains the temperature through the entire period of cooking within such limits, and without any attention being paid thereto by the attendant.

The water of condensation forming in the bottom of the heating chamber is free to drain off through the pipes 34 and 38.

In actual practice the period of cooking may be simply the time required to attain the ultimate temperature at which the thermostat is set to operate, and occupies approximately fifteen minutes, and at the end of that period the steam supply and water supply are closed down. However, before the chamber cools materially the discharge valve 63 is opened, and the continued operation of the long screw 20 rapidly discharges the cooking chamber of its contents. The cooking chamber having thus been emptied, the valve 63 is again closed, the valve 66 is opened, the plug 65' withdrawn, and the cooking chamber and its feed mechanism may then be thoroughly cleaned and sterilized by hot water introduced through the feed hopper and churned by continued rotation of the screws 29 and 20. The water discharge valve 66 is then closed, the hopper 28 reloaded with a fresh batch of stock to be treated, and the above described cycle of operations repeated.

I claim—

1. In an apparatus for treating cheese, the combination with a trough and cover forming a cooking chamber, of a heating jacket on said trough, and a rotatable spiral extending lengthwise of said trough and occupying only a portion of the trough cross-section, thereby providing a passageway in the trough above said spiral for permitting rearward movement of the cheese, said chamber having a normally closed discharge opening at one end, whereby said trough is adapted to be substantially filled with cheese, the full load of cheese subjected to heat and circulated longitudinally of the trough as an incident to the operation of said spiral, and discharged from the trough after the desired treatment is completed.

2. In an apparatus for treating cheese, the combination with an elongated cooking chamber having a normally closed discharge opening at one end, of a rotatable spiral mounted in and lengthwise of said chamber, said spiral occupying only a portion of the cross section of said trough so as to provide longitudinally extending space therein above said spiral for permitting rearward movement of the cheese over the spiral and a removable closure for said opening, whereby said trough is adapted to receive a predetermined load of cheese to be treated, the load circulated longitudinally of the trough as an incident to operation of said spiral and discharged from the trough through said discharge opening after the desired treatment is completed.

ARTHUR W. BELL.